(12) United States Patent  
Salter et al.

(10) Patent No.: US 10,308,168 B2  
(45) Date of Patent: Jun. 4, 2019

(54) AUTONOMOUS VEHICLE SERVICE LIGHTS

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US); Annette Lynn Huebner, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/493,224

(22) Filed: Apr. 21, 2017

(65) Prior Publication Data

US 2018/0304801 A1 Oct. 25, 2018

(51) Int. Cl.
| | |
|---|---|
| *B60Q 1/26* | (2006.01) |
| *B60Q 1/34* | (2006.01) |
| *B60Q 1/54* | (2006.01) |
| *G05D 1/00* | (2006.01) |

(52) U.S. Cl.
CPC ............ *B60Q 1/34* (2013.01); *B60Q 1/2696* (2013.01); *B60Q 1/54* (2013.01); *G05D 1/0088* (2013.01)

(58) Field of Classification Search
CPC ...... B60Q 1/2611; B60Q 1/2661; B60Q 1/24; B60Q 1/326; B60W 30/09; G05D 1/0044
See application file for complete search history.

(56) References Cited

U.S. PATENT DOCUMENTS

| | | | | |
|---|---|---|---|---|
| 4,426,028 | A | | 1/1984 | Bott |
| 4,947,293 | A | * | 8/1990 | Johnson .................. B60Q 1/32 362/485 |
| 5,846,117 | A | * | 12/1998 | McGaffigan ........... A63H 17/28 446/219 |
| 6,114,954 | A | | 9/2000 | Palett et al. |
| 8,414,168 | B2 | | 4/2013 | Jutila et al. |
| 9,336,436 | B1 | | 5/2016 | Downdall |
| 9,507,346 | B1 | | 11/2016 | Levinson et al. |
| 9,953,538 | B1 | * | 4/2018 | Matthiesen ............ G08G 1/166 |
| 2006/0238368 | A1 | * | 10/2006 | Pederson ............. B60Q 1/2611 340/815.45 |
| 2014/0214260 | A1 | * | 7/2014 | Eckert .................... B60Q 1/488 701/28 |
| 2015/0170429 | A1 | * | 6/2015 | Denny .................. B60W 30/09 701/36 |
| 2016/0052445 | A1 | | 2/2016 | Huang |

* cited by examiner

*Primary Examiner* — Omeed Alizada (74) *Attorney, Agent, or Firm* — Carlson, Gaskey & Olds (57) ABSTRACT

An autonomous vehicle includes a vehicle body and an illuminated stripe assembly mounted to the vehicle body. The illuminated stripe assembly is adapted to emit a plurality of stripe patterns that are visually distinctive from one another for indicating different operating states of the autonomous vehicle.

21 Claims, 7 Drawing Sheets

AUTONOMOUS VEHICLE SERVICE LIGHTS

TECHNICAL FIELD

This disclosure relates to autonomous vehicles. An exemplary autonomous vehicle includes an illuminated stripe assembly adapted to emit a plurality of different stripe patterns for indicating various operating states of the autonomous vehicle.

BACKGROUND

An autonomous vehicle is a vehicle that can be operated either wholly or partially autonomously, i.e., without input from a human operator. For example, the autonomous vehicle may include a control system and various onboard sensors for controlling travel of the vehicle from one location to another. The operating state of the autonomous vehicle is not always clear to service controllers, pedestrians, and/or other vehicle operators.

SUMMARY

An autonomous vehicle according to an exemplary aspect of the present disclosure includes, among other things, a vehicle body and an illuminated stripe assembly mounted to the vehicle body and adapted to emit a plurality of stripe patterns that are visually distinctive from one another for indicating different operating states of the autonomous vehicle.

In a further non-limiting embodiment of the foregoing autonomous vehicle, a first stripe pattern of the plurality of stripe patterns indicates that the autonomous vehicle is moving and a second stripe pattern of the plurality of stripe patterns indicates that the autonomous vehicle is turning.

In a further non-limiting embodiment of either of the foregoing autonomous vehicles, the plurality of stripe patterns are visually distinctive in terms of at least color and brightness.

In a further non-limiting embodiment of any of the foregoing autonomous vehicles, the plurality of stripe patterns are visually distinctive in terms of at least pulse rate.

In a further non-limiting embodiment of any of the foregoing autonomous vehicles, at least one of the plurality of stripe patterns emits pulsing lights, and a pulse rate of the pulsing lights is tied to a speed of the autonomous vehicle.

In a further non-limiting embodiment of any of the foregoing autonomous vehicles, at least one of the plurality of stripe patterns emits flashing lights.

In a further non-limiting embodiment of any of the foregoing autonomous vehicles, one of the plurality of stripe patterns indicates that wheels of the autonomous vehicle are slipping.

In a further non-limiting embodiment of any of the foregoing autonomous vehicles, one of the plurality of stripe patterns indicates that a path of the autonomous vehicle has been blocked.

In a further non-limiting embodiment of any of the foregoing autonomous vehicles, one of the plurality of stripe patterns indicates that the autonomous vehicle is under the control of a service control operator but no movement has yet been requested.

In a further non-limiting embodiment of any of the foregoing autonomous vehicles, the illuminated stripe assembly includes a front section, a rear section, a first side section, and a second side section.

In a further non-limiting embodiment of any of the foregoing autonomous vehicles, each of the front section, the rear section, the first side section, and the second side section includes a housing, at least one light source, and at least one optic device.

In a further non-limiting embodiment of any of the foregoing autonomous vehicles, the at least one light source is a light emitting diode (LED).

In a further non-limiting embodiment of any of the foregoing autonomous vehicles, the illuminated stripe assembly is mounted at a roof of the vehicle body.

In a further non-limiting embodiment of any of the foregoing autonomous vehicles, a front section of the illuminated stripe assembly is mounted to a first cross member of the vehicle body, a rear section of the illuminated stripe assembly is mounted to a second cross member of the vehicle body, a first side section of the illuminated stripe assembly is mounted to a first side rail of the vehicle body, and a second side section of the illuminated stripe assembly is mounted to a second side rail of the vehicle body.

In a further non-limiting embodiment of any of the foregoing autonomous vehicles, the illuminated stripe assembly is adapted to emit visual cues around an entire perimeter of a roof of the vehicle body.

A method according to another exemplary aspect of the present disclosure includes, among other things, producing a first stripe pattern on an illuminated stripe assembly of an autonomous vehicle to indicate a first operating state of the autonomous vehicle and producing a second stripe pattern on the illuminated stripe assembly to indicate a second vehicle state that is different from the first vehicle state.

In a further non-limiting embodiment of the foregoing method, the method includes producing a third stripe pattern on the illuminated stripe assembly to indicate a third vehicle state that is different from the first vehicle state and the second vehicle state.

In a further non-limiting embodiment of either of the foregoing methods, the method includes producing a fourth stripe pattern on the illuminated stripe assembly to indicate a fourth vehicle state that is different from the first vehicle state, the second vehicle state, and the third vehicle state.

In a further non-limiting embodiment of any of the foregoing methods, the method includes producing a fifth stripe pattern on the illuminated stripe assembly to indicate a fifth vehicle state that is different from the first vehicle state, the second vehicle state, the third vehicle state, and the fourth vehicle state.

In a further non-limiting embodiment of any of the foregoing methods, producing the first stripe pattern includes indicating that the autonomous vehicle is moving, and wherein producing the second stripe pattern indicates that the autonomous vehicle is turning.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details autonomous vehicles equipped with illuminated stripe assemblies for providing visual feedback of autonomous vehicle operation. An exemplary autonomous vehicle includes an illuminated stripe assembly mounted to a vehicle body and adapted to emit a plurality of visually distinctive stripe patterns for indicating different operating states of the autonomous vehicle. These and other features of this disclosure are described in greater detail below.

Figure 1:
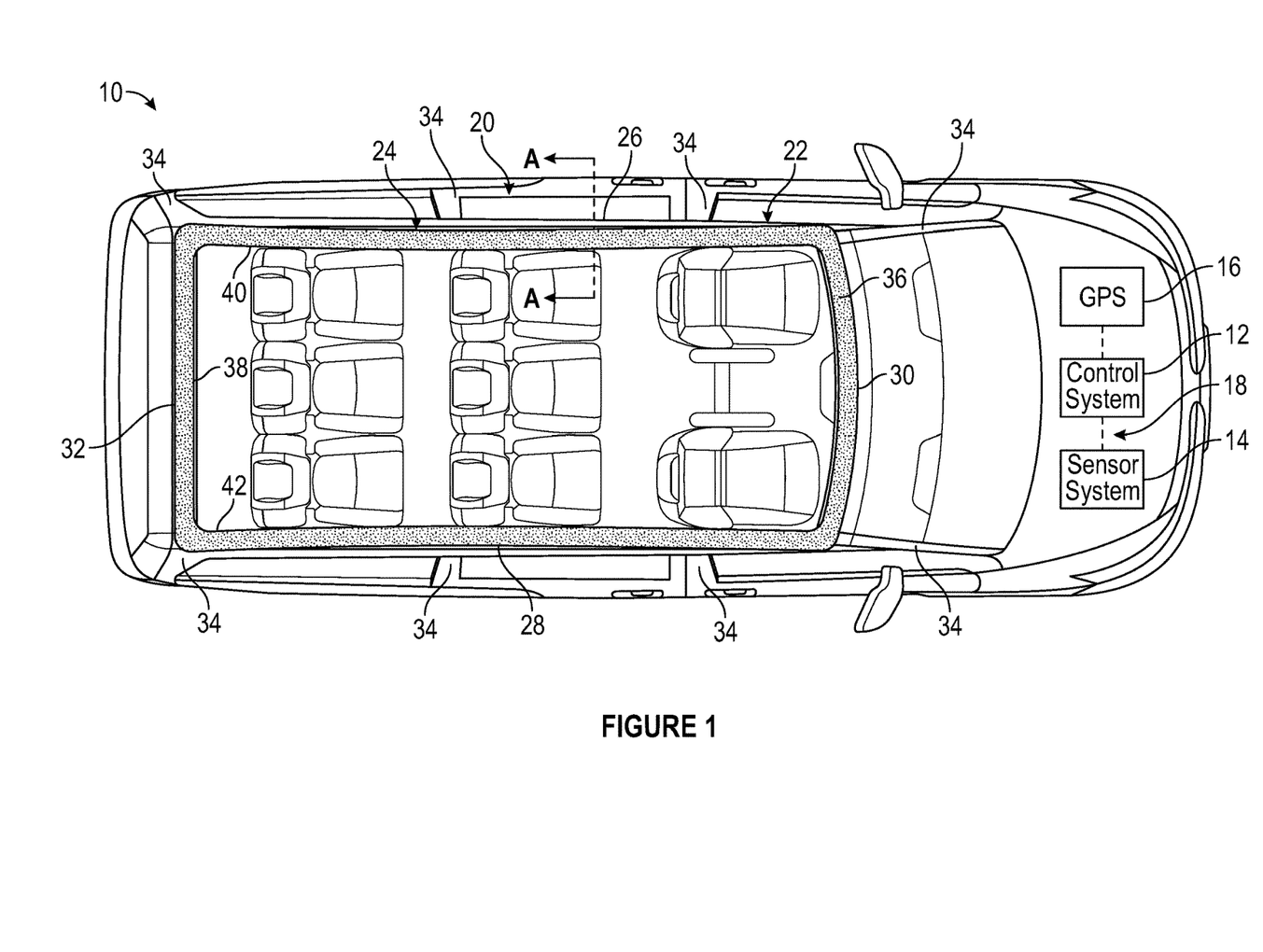
FIG. 1 illustrates an autonomous vehicle equipped with an illuminated stripe assembly.

FIG. 1 schematically illustrates an autonomous vehicle 10. The autonomous vehicle 10 may be a car, a truck, a van, or any other vehicle. Although a specific component relationship is illustrated in the figures of this disclosure, the illustrations are not intended to limit this disclosure. In other words, the placement and orientation of the various components of the autonomous vehicle 10 are shown schematically and could vary within the scope of this disclosure.

The autonomous vehicle 10 is a driverless vehicle capable of sensing its environment and navigating between locations with little to no human input. In an embodiment, the autonomous vehicle 10 includes a control system 12, a sensor system 14, and a global positioning system (GPS) 16 that are capable of communicating with one another for controlling operation of the autonomous vehicle 10 with little to no human input. The autonomous vehicle 10 may include various other systems and components for achieving driverless functionality. In an embodiment, the control system 12, the sensor system 14, the GPS 16, and various other systems (e.g., steering, braking, accelerating, etc.) communicate with one another over a controlled area network (CAN) 18.

The sensor system 14 may communicate with the control system 12 for providing information about the environment within which the autonomous vehicle 10 is operating. The sensor system 14 may include various cameras, radar, and lasers that provide raw information about the surrounding environment. This information can be analyzed and processed by the control system 12 for controlling the autonomous vehicle 10, such as along a desired route.

The GPS 16 may also communicate with the control system 12 for providing information such as vehicle position, speed, and directionality. A map database is stored within the GPS 16 or can be remotely accessed by the GPS 16 (e.g., over a wireless data connection) for route planning and monitoring.

In an embodiment, the autonomous vehicle 10 is controlled by a service controller operator located remotely from the autonomous vehicle 10. The service controller operator may utilize various control pads, joysticks, buttons, touch screens, etc. for controlling movement of the autonomous vehicle 10.

In another embodiment, the autonomous vehicle 10 is a fully automated system that requires no human intervention other than setting a destination on the GPS 16 and starting the autonomous vehicle 10. It should be understood that this disclosure is applicable to any type of autonomous vehicle.

The exemplary autonomous vehicle 10 includes a vehicle body 20 and an illuminated stripe assembly 22. The illuminated stripe assembly 22 can be selectively controlled to provide visual feedback of operating states of the autonomous vehicle 10 to pedestrians, service control operators, and/or operators of other vehicles. In an embodiment, the illuminated stripe assembly 22 is controlled by the control system 12. The control system 12 may include one more control modules equipped with executable instructions for interfacing with and commanding operation of various components of the autonomous vehicle 10, including but not limited to the illuminated stripe assembly 22. Each such control module may include a processing unit and non-transitory memory for executing the various control strategies and modes of the autonomous vehicle 10. The processing unit, in an embodiment, is configured to execute one or more programs stored in the memory of the control system 12. A first exemplary program, when executed, may determine when and how to illuminate the illuminated stripe assembly 22. The control system 12 may control various other functions associated with the illuminated stripe assembly 22 of the autonomous vehicle 10.

The illuminated stripe assembly 22 is mounted to a portion of the vehicle body 20. In an embodiment, the illuminated stripe assembly 22 is mounted at a roof 24 of the vehicle body 20. Other mounting locations are also contemplated within the scope of this disclosure.

The roof 24 may include side rails 26, 28 extending longitudinally between the front and the rear of the autonomous vehicle 10 and cross members 30, 32 extending horizontally between the side rails 26, 28. The side rails 26, 28 and cross members 30, 32 are supported by two or more pillars 34 (e.g., A-pillar, B-pillar, C-pillar, D-pillar, etc.) of the vehicle body 20. The illuminated stripe assembly 22 may include a front section 36 mounted to the cross member 30, a rear section 38 mounted to the cross member 32, a first side section 40 mounted to the side rail 26, and a second side section 42 mounted to the side rail 28. When illuminated, the front section 36 generally provides visual feedback to the front of the autonomous vehicle 10, the rear section 38 generally provides visual feedback to the rear of the autonomous vehicle 10, and the first and second side sections 40, 42 generally provide visual feedback to the sides of the autonomous vehicle 10. In this way, the illuminated stripe assembly 22 provides visual cues around an entire perimeter of the roof 24 of the autonomous vehicle 10.

Figure 2:
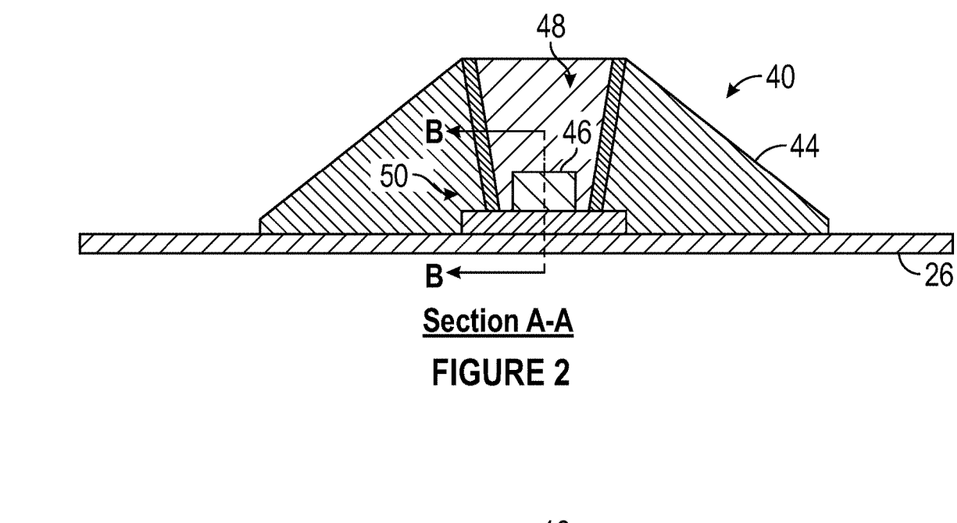
FIG. 2 is a sectional view of Section A-A of FIG. 1.

FIG. 2 is a cross-sectional view through a portion of the illuminated stripe assembly 22. Although the cross-sectional view of FIG. 2 is taken through the first side section 40 of the illuminated stripe assembly 22 (see section A-A of FIG. 1), the front section 36, the rear section 38, and the second side section 42 could include similar configurations. In an embodiment, each section of the illuminated stripe assembly 22 includes a housing 44, one or more light sources 46, and one or more optic devices 48. Although not specifically shown or described, the illuminated stripe assembly 22 could include additional components such as reflectors, thermal transfer tape, sealing devices, etc.

The housing 44 houses the light source 46 and the optic device 48. In an embodiment, the housing 44 is made of a thermally conductive plastic. The housing 44 may be at least partially clear or transparent for emitting the light generated by the light source 46. The light that is ultimately emitted through the housing 44 provides visual feedback of various operating states of the autonomous vehicle 10 to pedestrians, service control operators, and/or operators of other vehicles.

The optic device(s) 48 focuses the light emitted by the light source 46, such as in a narrow pattern that can be emitted through the housing 44. In an embodiment, each optic device 48 is made of an acrylic material.

Figure 3:
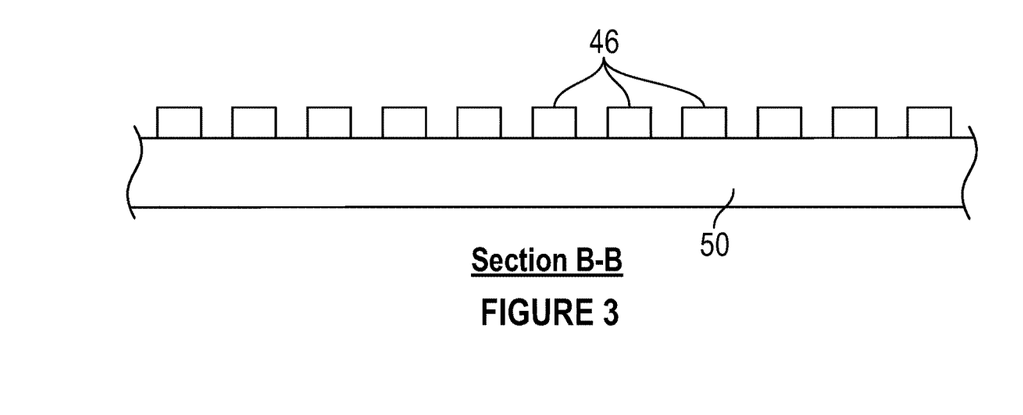
FIG. 3 is a sectional view of Section B-B of FIG. 2.

In another embodiment, each light source 46 is a light emitting diode (LED). Other light sources could also be utilized within the scope of this disclosure. The illuminated stripe assembly 22 may include a plurality of the light sources 46 arranged in a strip (see, e.g., FIG. 3). The total number of light sources 46 may vary and is vehicle dependent. In an embodiment, the illuminated stripe assembly 22 includes a sufficient number of light sources 46 for visualizing the stripe patterns emitted therefrom during both daytime conditions and nighttime conditions.

Each light source 46 of the illuminated stripe assembly 22 may be mounted to a printed circuit board (PCB) 50. The PCB 50 may be mounted to the vehicle body 20 (here, the side rail 26) such that the vehicle body 20 acts as a heat sink for removing the heat generated by the light sources 46.

Each light source 46 of the illuminated stripe assembly 22 can be selectively controlled, such as by the control system 12, to generate various stripe patterns that can be emitted by the illuminated stripe assembly 22 for indicating different operating states of the autonomous vehicle 10. FIGS. 4-8 schematically illustrate various examples of such stripe patterns. It should be understood that the illustrated stripe patterns are intended as non-limiting examples of the type of visual cues that can be created by the illuminated stripe assembly 22. A legend is included in each of FIGS. 4-8 to aid the understanding of each exemplary stripe pattern.

Figure 4:
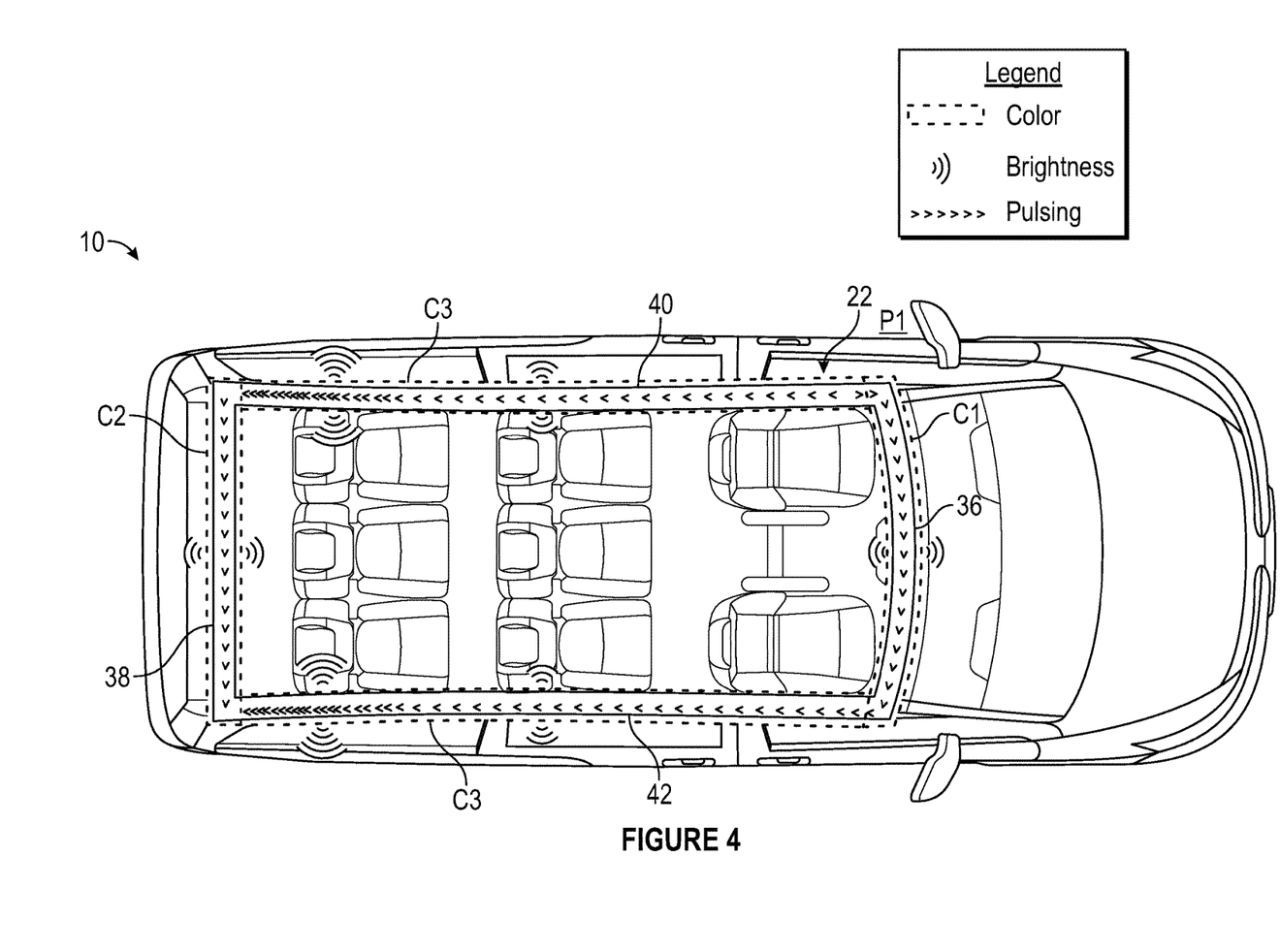
FIG. 4 illustrates a first stripe pattern of an illuminated stripe assembly.

FIG. 4 illustrates a first exemplary stripe pattern P1 that can be generated by the illuminated stripe assembly 22. The first stripe pattern P1 can be emitted from the illuminated stripe assembly 22 to indicate that the autonomous vehicle 10 is moving or about to move, that the autonomous vehicle 10 is under the control of a service control operator, the speed at which the autonomous vehicle 10 is moving, and the direction the autonomous vehicle 10 is moving in.

If the first stripe pattern P1 has been commanded, each of the front section 36, the rear section 38, the first side section 40, and the second side section 42 of the illuminated stripe assembly 22 emits light having a specific color, brightness, and pulsing action. For example, the front section 36 may emit light having a first color C1 (e.g., white) that pulses from 50% to 100% brightness across its width, and the rear section 38 may emit light having a second color C2 (e.g., red) that pulses from 50% to 100% brightness across its width. The pulse rate of the lights generated by the front section 36 and the rear section 38 may be tied to the speed at which the autonomous vehicle 10 is being operated. In other words, the faster the autonomous vehicle 10 is traveling, the higher the pulse rate of the lights emitted by the front and rear sections 36, 38.

Simultaneously with the front and rear sections 36, 38, the first and second side sections 40, 42 may emit lights having a third color C3 (e.g., amber) that pulses with a brightness that increases in the direction of vehicle movement (i.e., from front to back if the vehicle is moving forward or from back to front if the vehicle is moving backwards). The pulse rate of the lights of the first and second side sections 40, 42 may also be tied to the speed at which the autonomous vehicle 10 is being operated.

Figure 5:
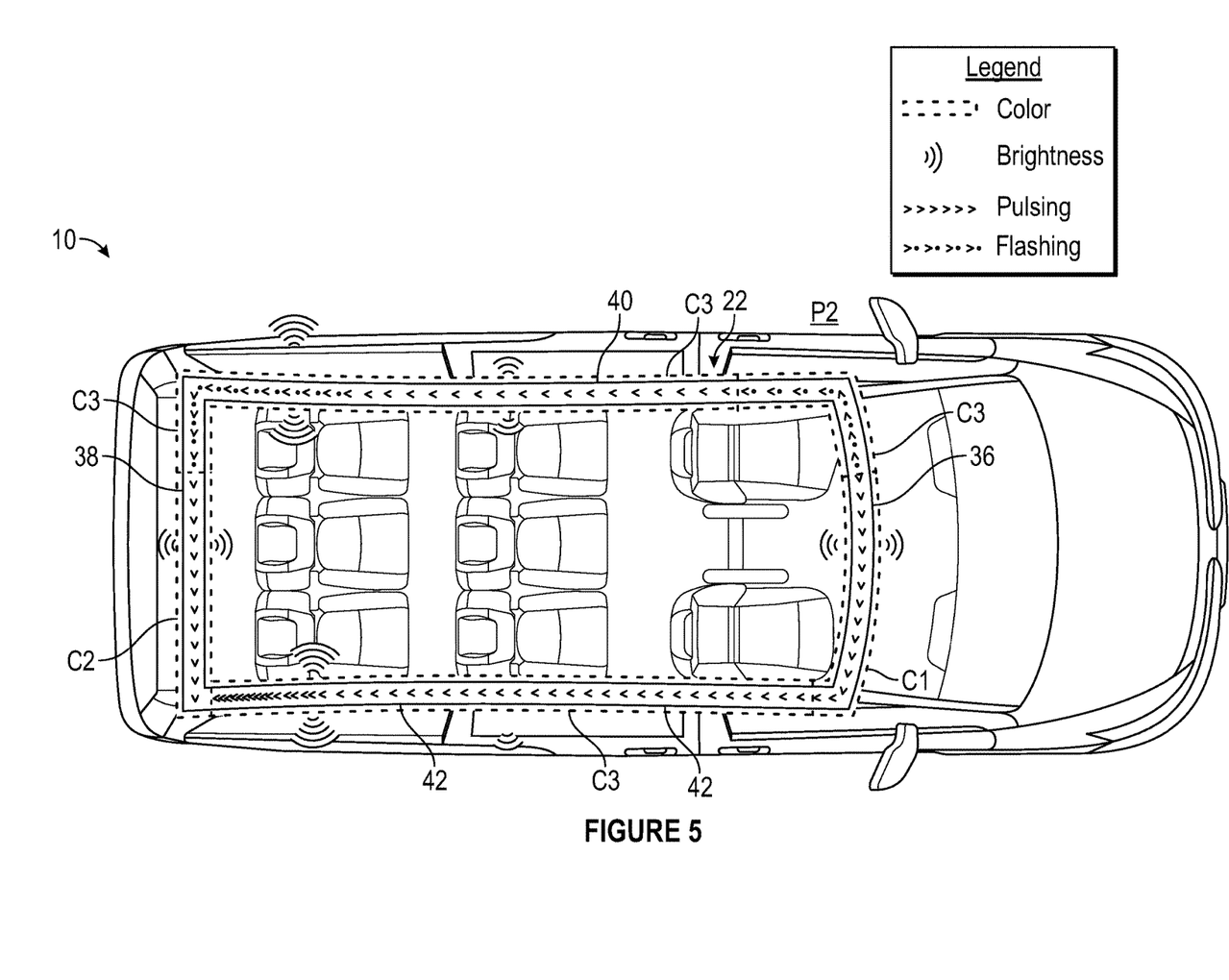
FIG. 5 illustrates a second stripe pattern of an illuminated stripe assembly.

FIG. 5 illustrates a second exemplary stripe pattern P2 that can be generated by the illuminated stripe assembly 22. The second stripe pattern P2 can be emitted by the illuminated stripe assembly 22 to indicate both that the autonomous vehicle 10 is turning and the direction of the turn.

If the second stripe pattern P2 been commanded, each of the front section 36, the rear section 38, the first side section 40, and the second side section 42 of the illuminated stripe assembly 22 emits light having a specific color, brightness, and pulsing action, and one or more of these sections may additionally flash to indicate that the autonomous vehicle 10 is turning. For example, a first portion of the front section 36 may emit a flashing light having the third color C3 (e.g., amber) on the side of the front section 36 that is in the direction the vehicle is turning (here, the driver side), and the remaining portion of the front section 36 may pulse the first color C1 (e.g. white) from 50% to 100% brightness across its width. A first portion of the rear section 38 also emit a flashing light of the third color C3 on the side of rear section 38 that is in the direction the vehicle is turning, and the remaining portion of the rear section 38 may emit light having the second color C2 that pulses from 50% to 100% brightness across its width.

Simultaneously with the front and rear sections 36, 38, the first and second side sections 40, 42 may emit lights having the third color C3 (e.g., amber) that pulses with a brightness that increases in the direction of vehicle movement (i.e., from front to back if the vehicle is moving forward or from back to front if the vehicle is moving backwards). Portions of either the first side section 40 or the second side sections 42 nearest the front section 36 and the rear section 38 may also emit flashing lights that indicate the direction the autonomous vehicle 10 is turning.

Figure 6:
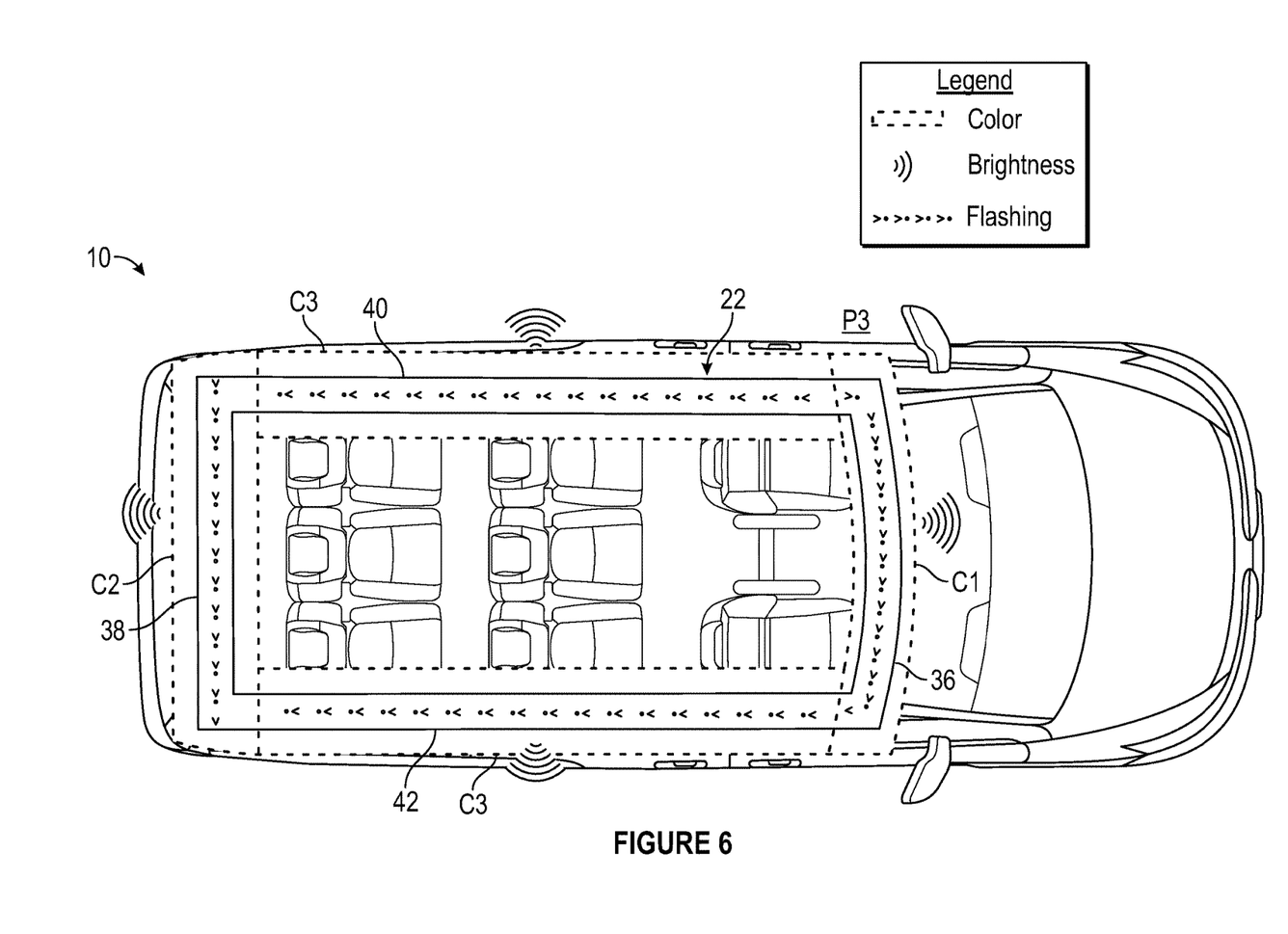
FIG. 6 illustrates a third stripe pattern of an illuminated stripe assembly.

FIG. 6 illustrates a third exemplary stripe pattern P3 that can be generated by the illuminated stripe assembly 22. The third stripe pattern P3 can be emitted from the illuminated stripe assembly 22 to indicate that the wheels of autonomous vehicle 10 are slipping (e.g., ABS warning, traction control warning, stability warning, etc.).

If the third stripe pattern P3 has been commanded, the light sources of each of the front section 36, the rear section 38, the first side section 40, and the second side section 42 of the illuminated stripe assembly 22 stop pulsing and immediately change to double normal brightness. For example, the front section 36 may emit light having the first color C1 (e.g., white) at double normal brightness and which does not pulse, the rear section 38 may emit light having the second color C2 (e.g., red) at double normal brightness and which does not pulse, and the first and second side sections 40, 42 may emit lights having the third color C3 (e.g., amber) at double normal brightness and which do not pulse. In another embodiment, such as if the autonomous vehicle 10 is on-road and carrying human passengers, each of the front section 36, the rear section 38, the first side section 40, and the second side section 42 of the illuminated stripe assembly 22 may also emit flashing lights at double normal brightness during the third stripe pattern P3.

Figure 7:
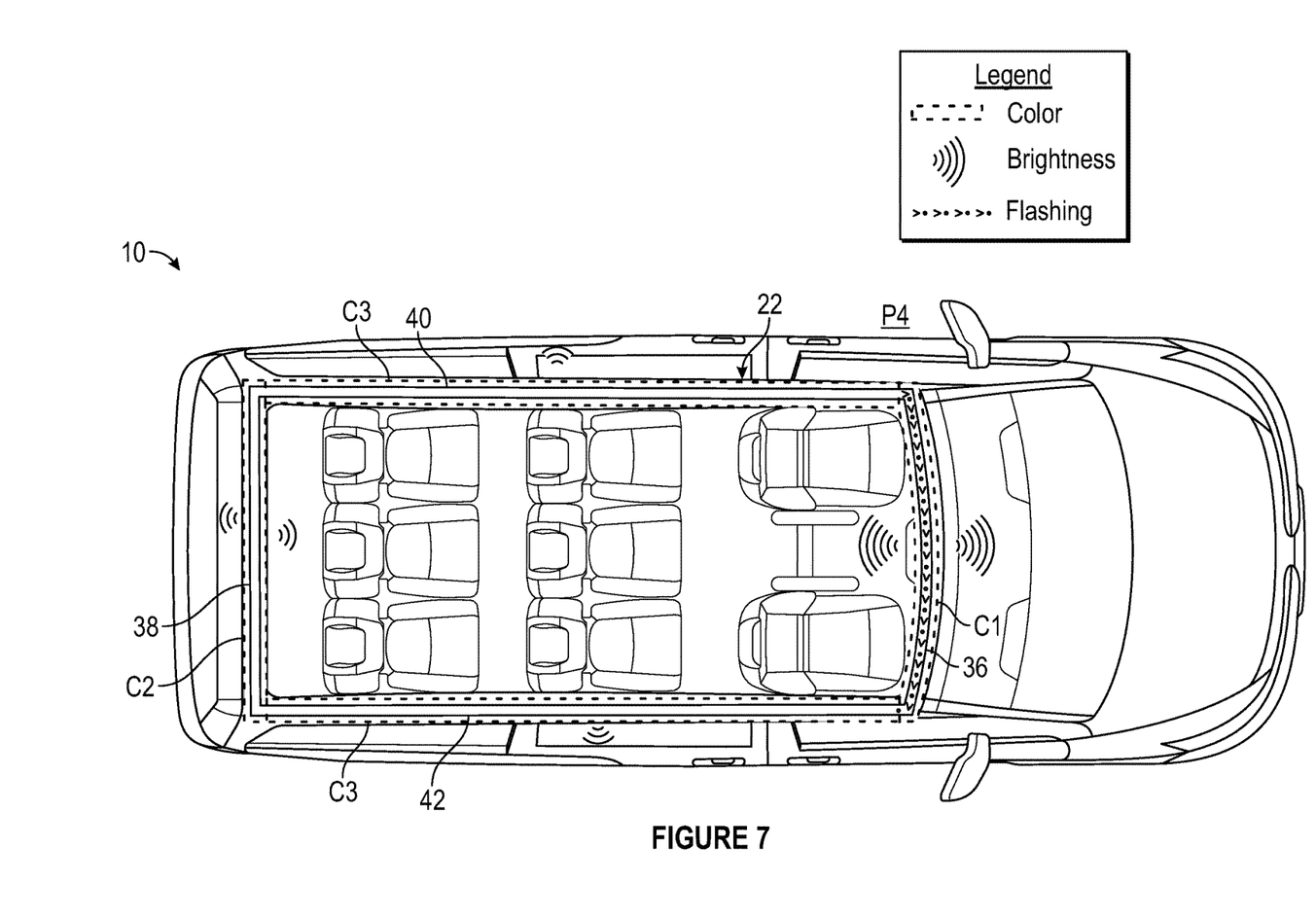
FIG. 7 illustrates a fourth stripe pattern of an illuminated stripe assembly.

FIG. 7 illustrates a fourth exemplary stripe pattern P4 that can be generated by the illuminated stripe assembly 22. The fourth stripe pattern P4 can be used to indicate that the path of the autonomous vehicle 10 has been blocked, such as by an object in the roadway.

If the fourth stripe pattern P4 has been commanded, the light sources of each of the front section 36, the rear section 38, the first side section 40, and the second side section 42 of the illuminated stripe assembly 22 stop pulsing and immediately change to 50% normal brightness. The front section 36 may then begin to emit flashing lights at triple normal brightness at 33% duty cycle (i.e., ⅓ second on, ⅔ second off). The front section 36 emits light having the first color C1 (e.g., white), the rear section 38 emits light having the second color C2 (e.g., red), and the first and second side sections 40, 42 emit lights having the third color C3 (e.g., amber) during the fourth stripe pattern P4.

Figure 8:
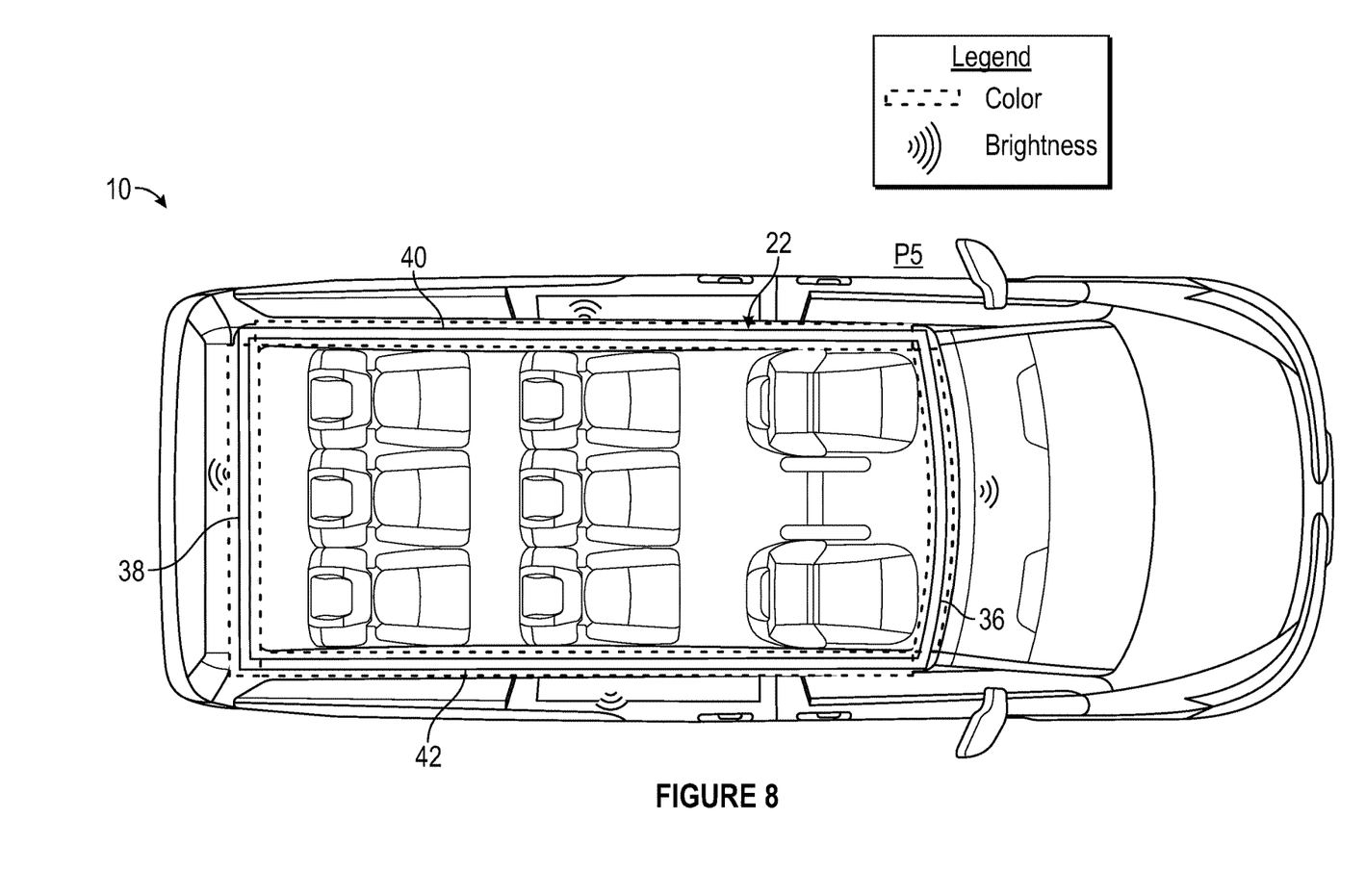
FIG. 8 illustrates a fifth stripe pattern of an illuminated stripe assembly.

FIG. 8 illustrates a fifth exemplary stripe pattern P5 that can be generated by the illuminated stripe assembly 22. The fifth stripe pattern P5 can be used to indicate that the autonomous vehicle 10 is under the control of a service control operator but no movement has yet been called for. The fifth stripe pattern P5 thus mainly applies to autonomous vehicles under the control of service control operators.

If the fifth stripe pattern P5 has been commanded, the light sources of each of the front section 36, the rear section 38, the first side section 40, and the second side section 42 of the illuminated stripe assembly 22 stop pulsing and immediately change to approximately 20% normal brightness. In an embodiment, each section of the illuminated stripe assembly 22 emits light having a green color if no vehicle issues exist that would prevent use or safe movement of the autonomous vehicle 10. In another embodiment, each section of the illuminated stripe assembly 22 emits light having an amber color if vehicle issues do exist that would prevent use or safe movement of the autonomous vehicle 10. In yet another embodiment, each section of the illuminated stripe assembly 22 emits light having a purple color if vehicle cleaning is required in order for the sensor system 14 to operate properly to sense various conditions of the surrounding environment of the autonomous vehicle 10.

The illuminated stripe assembly described herein facilitates improved visual feedback of various autonomous vehicle operating states to persons outside of the vehicle (e.g., pedestrians, service control operators, and/or operators of other vehicles). The visual feedback can be viewed from distances greater than 100 feet from the vehicle and even when the vehicle is operating at relatively low speeds.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An autonomous vehicle, comprising:
   a vehicle roof;
   an illuminated stripe assembly mounted at a perimeter of the vehicle roof and adapted to emit a plurality of stripe patterns around an entirety of the perimeter, and the plurality of stripe patterns are visually distinctive from one another for indicating different operating states of the autonomous vehicle; and
   a control system adapted to control the illuminated stripe assembly for selectively indicating the different operating states.

2. The autonomous vehicle as recited in claim 1, wherein a first stripe pattern of the plurality of stripe patterns indicates that the autonomous vehicle is moving and a second stripe pattern of the plurality of stripe patterns indicates that the autonomous vehicle is turning.

3. The autonomous vehicle as recited in claim 1, wherein the plurality of stripe patterns are visually distinctive in terms of at least color and brightness.

4. The autonomous vehicle as recited in claim 1, wherein the plurality of stripe patterns are visually distinctive in terms of at least pulse rate.

5. The autonomous vehicle as recited in claim 1, wherein at least one of the plurality of stripe patterns emits pulsing lights, and a pulse rate of the pulsing lights is tied to a speed of the autonomous vehicle.

6. The autonomous vehicle as recited in claim 1, wherein at least one of the plurality of stripe patterns emits flashing lights.

7. The autonomous vehicle as recited in claim 1, wherein one of the plurality of stripe patterns indicates that wheels of the autonomous vehicle are slipping.

8. The autonomous vehicle as recited in claim 1, wherein one of the plurality of stripe patterns indicates that a path of the autonomous vehicle has been blocked.

9. The autonomous vehicle as recited in claim 1, wherein one of the plurality of stripe patterns indicates that the autonomous vehicle is under the control of a service control operator but no movement has yet been requested.

10. The autonomous vehicle as recited in claim 1, wherein the illuminated stripe assembly includes a front section, a rear section, a first side section, and a second side section.

11. The autonomous vehicle as recited in claim 10, wherein each of the front section, the rear section, the first side section, and the second side section includes a housing, at least one light source, and at least one optic device.

12. The autonomous vehicle as recited in claim 11, wherein the at least one light source is a light emitting diode (LED).

13. The autonomous vehicle as recited in claim 1, wherein a front section of the illuminated stripe assembly is mounted to a first cross member of the vehicle roof, a rear section of the illuminated stripe assembly is mounted to a second cross member of the vehicle roof, a first side section of the illuminated stripe assembly is mounted to a first side rail of the vehicle roof, and a second side section of the illuminated stripe assembly is mounted to a second side rail of the vehicle roof.

14. A method, comprising:
    producing a first stripe pattern on an illuminated stripe assembly of an autonomous vehicle to indicate a first operating state of the autonomous vehicle; and
    producing a second stripe pattern on the illuminated stripe assembly to indicate a second vehicle state that is different from the first vehicle state,
    wherein the illuminated stripe assembly is configured to emit light of varying color, brightness, pulsing action, and flashing action,
    wherein the illuminated stripe assembly is mounted about an entire perimeter of a roof of the autonomous vehicle.

15. The method as recited in claim 14, comprising:
    producing a third stripe pattern on the illuminated stripe assembly to indicate a third vehicle state that is different from the first vehicle state and the second vehicle state.

16. The method as recited in claim 15, comprising:
producing a fourth stripe pattern on the illuminated stripe assembly to indicate a fourth vehicle state that is different from the first vehicle state, the second vehicle state, and the third vehicle state.

17. The method as recited in claim 16, comprising:
producing a fifth stripe pattern on the illuminated stripe assembly to indicate a fifth vehicle state that is different from the first vehicle state, the second vehicle state, the third vehicle state, and the fourth vehicle state.

18. The method as recited in claim 14, wherein producing the first stripe pattern includes indicating that the autonomous vehicle is moving, and wherein producing the second stripe pattern indicates that the autonomous vehicle is turning.

19. The method as recited in claim 14, wherein producing the first stripe pattern includes:
emitting light having a first color that pulses from 50% to 100% brightness across a width of a first section of the illuminated stripe assembly; and
emitting light having a second color that pulses from 50% to 100% brightness across a width of a second section of the illuminated stripe assembly.

20. The method as recited in claim 19, wherein producing the first stripe pattern includes:
emitting light having a third color that pulses with a brightness that increases in a direction of movement of the autonomous vehicle from a third section of the illuminated stripe assembly.

21. An autonomous vehicle, comprising:
a roof; and
an illuminated stripe assembly mounted to the roof and configured to emit a plurality of striping patterns that are visually distinctive in terms of color, brightness, pulsing action, and flashing action for indicating different operating states of the autonomous vehicle, wherein the illuminated stripe assembly includes a plurality of housings that together extend about an entire perimeter of the roof.

* * * * *